UNITED STATES PATENT OFFICE.

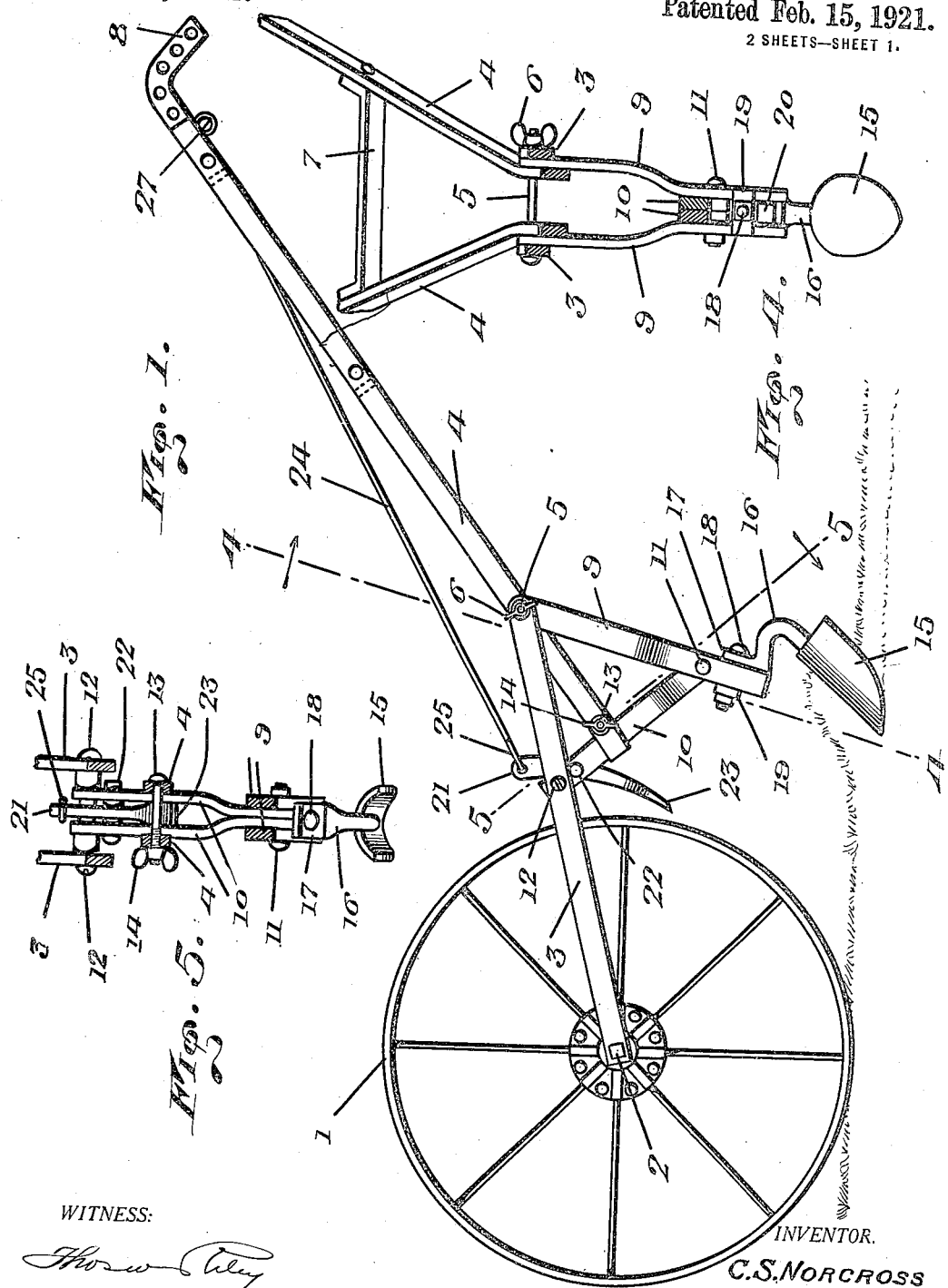

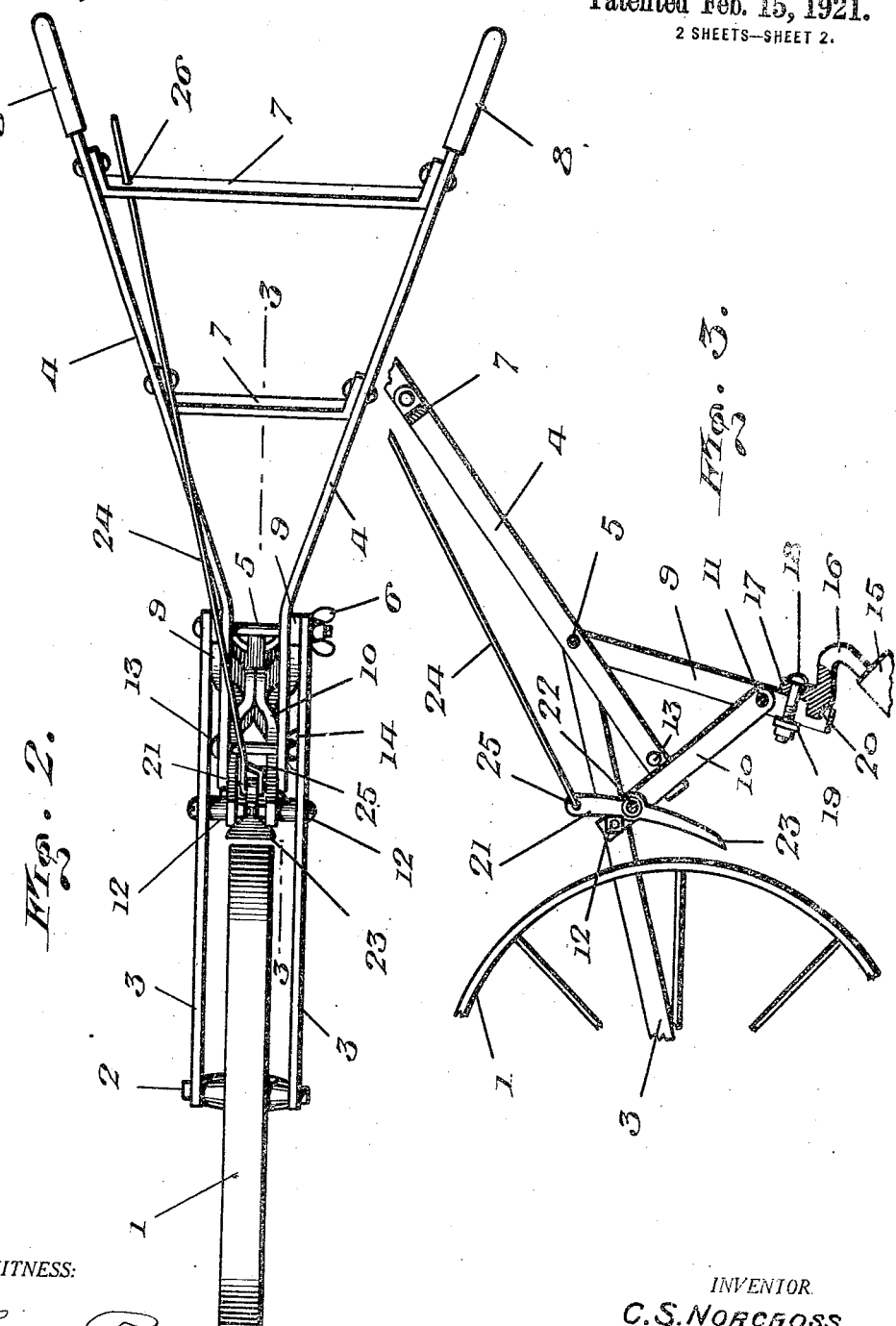

CAMILLO SIVORI NORCROSS, OF BUSHNELL, ILLINOIS.

WHEEL-CULTIVATOR.

1,368,744.  Specification of Letters Patent.  Patented Feb. 15, 1921.

Application filed January 21, 1920. Serial No. 352,984.

*To all whom it may concern:*

Be it known that I, CAMILLO SIVORI NORCROSS, a citizen of the United States, residing at Bushnell, in the county of McDonough and State of Illinois, have invented certain new and useful Improvements in Wheel-Cultivators; and I do hereby declare the following to be a full, clear, and exact description of the invention, such as will enable others skilled in the art to which it appertains to make and use the same.

This invention relates to cultivators and plows, and is particularly an improvement over the wheel plow disclosed in my previous Patent No. 1,222,122 granted April 10, 1917.

The invention has for its object the improvement and refinement of the frame construction of the cultivator, whereby to render the frame strong and substantial, yet light in weight and simple and inexpensive, without sacrificing the efficiency, and at the same time providing for economy and convenience in the manufacture of the device.

Another object is the provision of a frame construction having novel, yet simple and effective means for the adjustment of the handles, whereby they can be raised and lowered for persons of various heights from the smallest boy to the tallest adult, and such adjustment being accomplished quickly and conveniently and without complication, such as the necessity for removing bolts or making other difficult adjustments.

A further object is the provision of novel means for securing the cultivator or plow blade to the frame, in order that it can be attached and detached quickly and will be firmly held in place when attached.

A still further object is the provision of a wheel scraper and operating means therefor carried by the frame in a novel manner and operable to scrape the mud and dirt from the wheel.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the improved cultivator.

Fig. 2 is a plan view thereof.

Fig. 3 is a fragmentary vertical section taken on the line 3—3 of Fig. 2.

Figs. 4 and 5 are sectional views taken on the respective lines 4—4 and 5—5 of Fig. 1.

Any suitable ground wheel 1 is used for carrying the greater portion of the weight of the cultivator, and for guiding it over the ground, and the axle 2 of the wheel extends through the forward end portions of a pair of longitudinal side bars 3. The rear ends of the bars 3 overlap the handles 4, which also constitute bars of metal, said handles being inclined and extending rearwardly and upwardly from the bars 3, while the lower terminals of the handles 4 extend downwardly beyond the bars 3. The rear ends of the bars 3 and handles 4 are pivotally connected by means of a bolt 5 extending transversely therethrough, and having a wing nut 6 thereon which can be conveniently loosened and tightened by hand. A standard comprising a pair of bars 9 has its upper end pivotally engaging the bolt 5, said bars 3 and 9 being at the outer sides of the handles 4, and brace bars 10, have their lower ends secured between the bars 9 near the lower ends thereof, by means of a bolt 11 or other securing element, while the upper ends of the bars 10 are secured to the respective bars 3 by means of bolts 12, or the like. The bars 3, 9 and 10 constitute a triangular frame, as seen in Figs. 1 and 3, providing a simple yet strong construction, which is also neat and attractive in appearance. The brace bars 10 serve as braces and stays between the bars 3 and 9, for rendering the frame thoroughly rigid and strong, and it will be noted that the bars and handles are duplicated at opposite sides of the median plane of the cultivator in which the wheel 1 is located, whereby the frame is double. The lower portions of the bars 9 and 10 are preferably offset toward one another as shown, and the lower terminals of the bars 9 extend below the bolt 11 and are spaced apart for the attachment of the tool, as will hereinafter appear.

As above indicated, the handles 4 are pivotally mounted on the bolt 5, whereby said handles can be swung upwardly and downwardly on said bolt as a pivot, when the nut 6 is loosened, thereby affording quick and convenient means for raising and lowering the handles for persons of various heights, for the convenient use of the cultivator, by different persons. As an efficient and convenient means for holding the handles in positions to which they are adjusted, a friction grip is provided between the handles and brace bars 10, so that said bars not only brace the frame, but also constitutes means for holding the handles in adjustment. For this purpose, the lower terminals of the handles which project forwardly and downwardly beyond the bolt 5 overlap the outer sides of the bars 10 and bear against same frictionally. A bolt 13 extends through the handles 4 behind the bars 10 and has a thumb nut 14 thereon for conveniently forcing the lower terminals of the handles toward one another into frictional engagement with the bars 10. The bolt 13 or equivalent means is therefore used for causing the handles to grip the bars 10, thereby holding the handles in the position to which they have been set, while the nuts 6 and 14 were loosened. This not only provides for a quick adjustment, since it is only necessary to loosen said nuts to adjust the handles, but, furthermore, the handles can be adjusted accurately to any desired position between the upper and lower limits, thereby eliminating the objections to adjustments utilizing bolts inserted through apertures, or the like, which would not only require time and trouble to make adjustments, but which provide for a limited number of adjustments only. Thus, the bolt 5 at the juncture of the frame members or bars 3 and 9 serves as a pivot for the handles, while the opposite bars or frame members 10 provide means for the adjustment of the handles and the positioning thereof in various adjustments. Furthermore, the lower portions of the handles will, in extending between the bolt 5 and bars 10, strengthen the frame, and provide a rigid connection between the handles and said frame. A further advantage from a manufacturing view point, resides in the fact that the parts 3, 4, 9 and 10 can all be readily manufactured from ordinary metal stock, such as bars, thereby providing for economy in manufacture.

The handles 4 diverge from the bolt 5, and are connected by stays or tie bars 7, and have hand grips 8 at their upper ends.

Various tools can be used interchangeably with the cultivator, such as cultivator blades, shovel blades, scraper blades, weeding knives, and the like, and blade 15 illustrated can be taken to represent any suitable blade or tool. This blade 15 is provided with a shank 16 that has a flat portion 17 to bear against the edges of the bars 9 adjacent to the lower ends thereof, and a bolt 18 extends through the portion 17 and between said bars, and engages through a washer plate 19 bearing against the opposite edges of said bars, whereby to removably clamp the shank 16 to the feet bars or standards 9. This provides for quick attachment and detachment of the blade, and said portion 17 has a lug 20 to extend between the bars 9, whereby to prevent the tool from turning about the bolt 12 as a pivot. By slightly loosening the bolt 18 the shank 16 can be slid downwardly, thereby removing the bolt 18 from between the bars 9, and conversely, the blade can be quickly and easily attached by sliding the bolt 18 upwardly between the lower terminals of the bars 9 with the portion 17 and washer blade 19 at opposite edges of said bars.

The cultivater is provided with a scraper for removing mud or dirt from the rim of the wheel 1, and includes a lever 21 pivotally mounted on a pivot or bolt 22 extending through the bars 10 near the upper ends thereof, and the lower end of the lever 21 has a scraper blade 23. An operating rod 24 has its lower end loosely engaged, as at 25, with the upper end of the lever 21 and the upper terminal of said rod 24 passes through an aperture 26 in the uppermost stay 7 near one hand grip 8, and is provided with a finger ring 27 through which a finger can be inserted for conveniently pulling the rod 24 so as to swing the scraper 23 against the rim of the wheel.

Having thus described the invention, what is claimed as new is:—

1. A cultivator comprising a wheel to roll on the ground having an axle, a triangular frame, one side member of the frame being connected with said axle for the upward and downward swinging movement of the frame, another member of said frame providing a standard extending downwardly from the first named member for the attachment of a tool or blade, handles pivotally connected to said frame at that corner thereof where said members meet, the third member of the frame constituting a brace between the aforesaid members, said handles having portions projecting and overlapping said brace, and means for clamping said handle portions and brace together with said handles and first named member in different angles relatively to one another.

2. A cultivator comprising a ground wheel having an axle, a pair of bars at opposite sides of said wheel engaging said axle and extending rearwardly therefrom to swing upwardly and downwardly, a pivot connecting said bars near the rear ends thereof, a pair of bars forming a standard having their upper ends engaging said pivot, said standard bars extending downwardly from the first named bars for the attachment of a tool or blade, a pair of brace bars having their opposite ends secured to the first named and second named bars to hold them in relative position, handles mounted on said pivot and extending rearwardly therefrom, said handles having portions extending forwardly from the said pivot and overlapping said brace bars, and means engaging said handle portions and operable for clamping them frictionally against said brace bars to maintain the handles and first named bars in different relative positions.

In testimony whereof I have signed my name to this specification in the presence of two subscribing witnesses.

CAMILLO SIVORI NORCROSS.

Witnesses:
J. L. SANDERS,
J. H. C. GALE.